INVENTOR
WILLIAM W. HARDIN
BY Ronald J. Clark
ATTORNEY

Aug. 29, 1967 W. W. HARDIN 3,339,177

DATA CONSOLIDATION SYSTEM EMPLOYING CELL GROUPING WITH A PLURALITY OF SCANS WITHIN EACH CELL

Filed Jan. 30, 1964 4 Sheets-Sheet 2

Aug. 29, 1967 W. W. HARDIN 3,339,177

DATA CONSOLIDATION SYSTEM EMPLOYING CELL GROUPING WITH A PLURALITY OF SCANS WITHIN EACH CELL

Filed Jan. 30, 1964 4 Sheets-Sheet 3

3,339,177

DATA CONSOLIDATION SYSTEM EMPLOYING CELL GROUPING WITH A PLURALITY OF SCANS WITHIN EACH CELL

William W. Hardin, Endicott, N.Y., assignor to International Business Machines Corporation, New York, N.Y., a corporation of New York Filed Jan. 30, 1964, Ser. No. 341,273
16 Claims. (Cl. 340—146.3)

Figure 1:
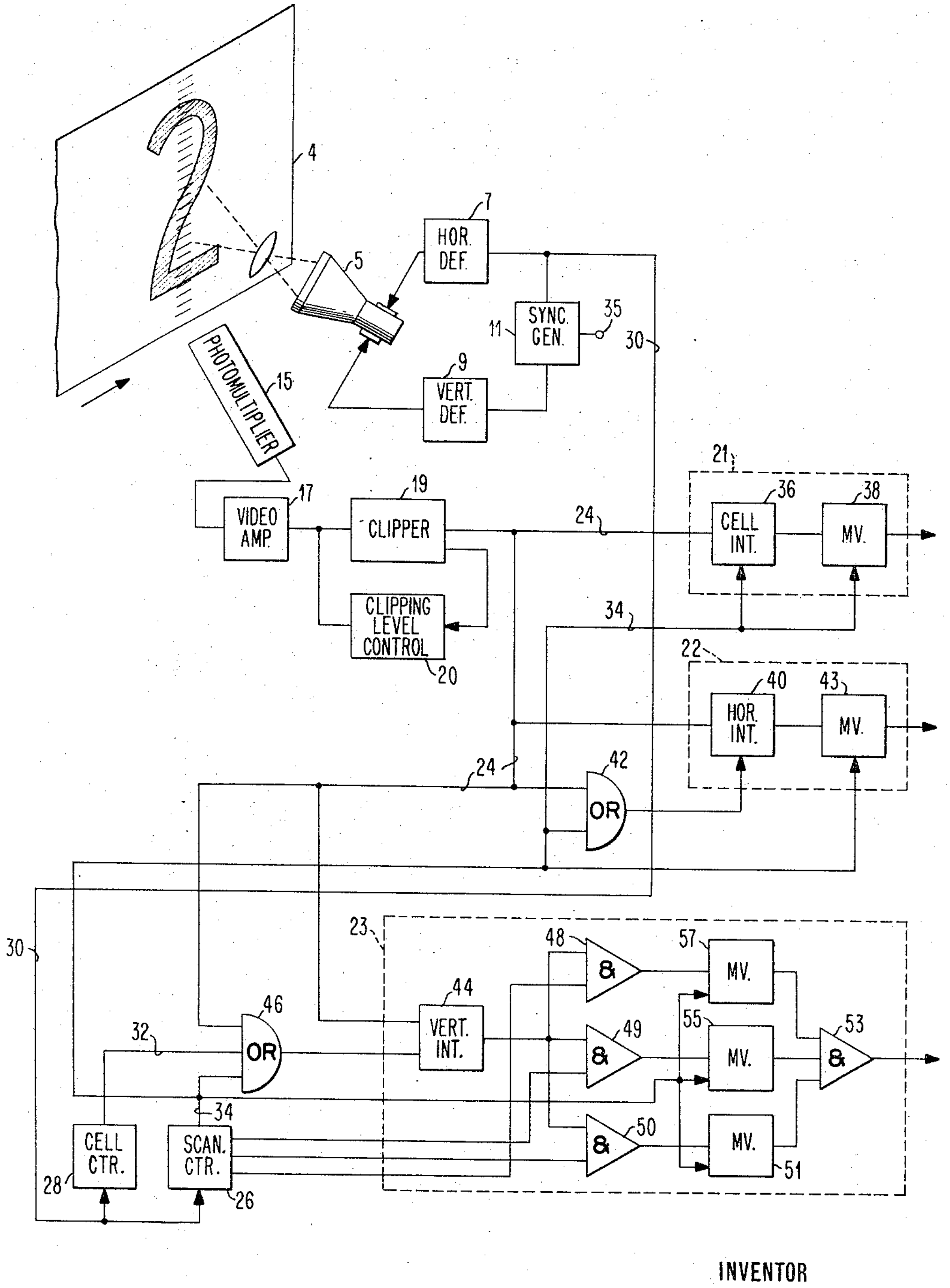

This invention relates to data consolidation systems for use in conjunction with pattern scanning systems, and more particularly to an improved data consolidation system for consolidating scanning data obtained by scanning patterns to be recognized, and for employing the consolidated data from present, past and future scanning operations to obtain reliable and accurate data for subsequent analysis.

It has previously been proposed to provide pattern recognition circuits in which the patterns to be recognized are scanned by means of a very small scanning spot. The use of a very small scanning spot is advantageous for supplying adequate scanning signals. However, the use of a small scanning spot is not without attendant difficulties. Its major disadvantage is that the amount of data which must be processed is greatly increased, if it is assumed that the scanning signals are analyzed directly. Also, if the data is analyzed in a raw or unconsolidated form, it could be misleading for certain patterns in that it could indicate a light area in portions of a pattern which should be considered as a dark area, so that marginal patterns will provide ambiguous outputs.

Additionally, it has been proposed to consolidate data obtained through fine spot scanning by determining whether or not, within the specified time interval, there was or was not a predetermined number of scanning signals supplied as the result of scanning a dark area. In other words, the data obtained over a predetermined time interval as the spot scanned a predetermined number of incremental areas must have indicated the fact that portions of the character were sensed for a predetermined percentage of the time interval before a decision was made that the entire area scanned during this period is to be considered as a black area. Previous systems also made use of additional criteria for determining when the nature of a particular scanning zone or cell is to be considered all black or all white. The criteria included the relative location of the black signals within the consolidation interval, or cell, and the consolidated information obtained from a previous interval, such as the last prior cell in the horizontal direction or the adjacent cell in a vertical direction, which cells had been previously scanned. Such a system is described by E. C. Greanias et al. in their U.S. Patent 2,959,769.

Briefly, the instant invention contemplates a pattern recognition system in which the scanning of patterns is accomplished by a succession of short scans in a horizontal direction, successively disposed in the vertical direction. Additionally, a plurality of the successive horizontal scans covering a discrete portion of the scanned figure are grouped together to form a cell. Each cell is examined for a plurality of decision criteria by summing circuits having various operating characteristics. The results of these examinations are stored in delay lines for later use in determining the black-white nature of the examined cell. Successive cells are examined and the results from each examination are also stored. Each of the summing circuits sums the value of the video signal occurring between the various synchronizing signals, which signals determine the various portions of the cell area. The first examination cumulates the entire video signal within the cell, and the nature of the cell is said to be black if a certain percentage of the video signal is black. The second examination looks at each discrete scan within the cell to find at least a black signal occurring for a minimum portion of each scan of a cell. The final examination seeks a continuous black information signal which may be contained in all scans of a particular cell, or may be partially contained in one or more scans.

The outputs of these summing circuits are stored for later use as previously mentioned. Each cell is similarly examined in each vertical raster. When a zone of cells has been examined, logic circuits utilized the stored data to generate a consolidated signal to decide the black-white nature of the center cell. A zone consists of adjacent cells surrounding the center or primary cell for which a decision is to be made. Therefore, a decision is made using previous and future information of cell conditions.

It is an object of the present invention to provide an improved data consolidation system which consolidates the scanning signals for a predetermined cell interval according to a plurality of different decision criteria.

Another object of this invention is to provide an improved data consolidation system in which the scanning signals are consolidated for a predetermined group of scans by examining the individual video signal for each scan or portion thereof.

It is a further object of the present invention to provide an improved data consolidation system in which the video signals within each cell are examined to ascertain the existence of a significant horizontal component.

It is another object of the invention to provide an improved data consolidation system in which coherent signals from present, past and future scanning intervals are employed to decide the nature of an individual cell scanning area.

It is a further object of the instant invention to effect consolidation of video signals by examining the scanning signals of a cell for significant vertical component.

It is an additional object of the instant invention to effect consolidation of video signals by examining the scanning signals of entire cell for a percentage of black information.

It is a still further object of this invention to store decision criteria for each cell to use this decision criteria from future and past cells to determine the black-white nature of an intermediate cell.

The foregoing and other objects, features and advantages of the invention will be apparent from the following more particular description of preferred embodiments of the invention, as illustrated in the accompanying drawings.

Figure 2:
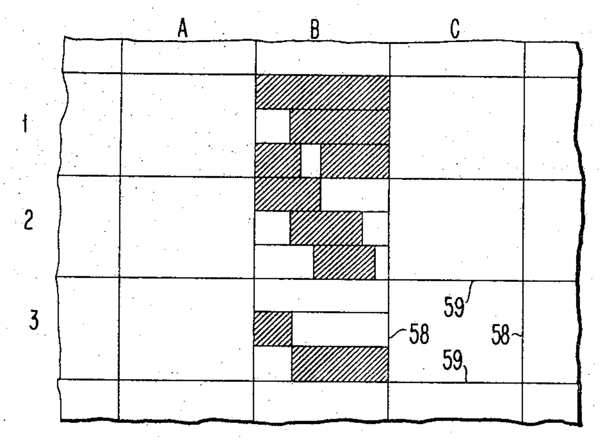
Figure 3:
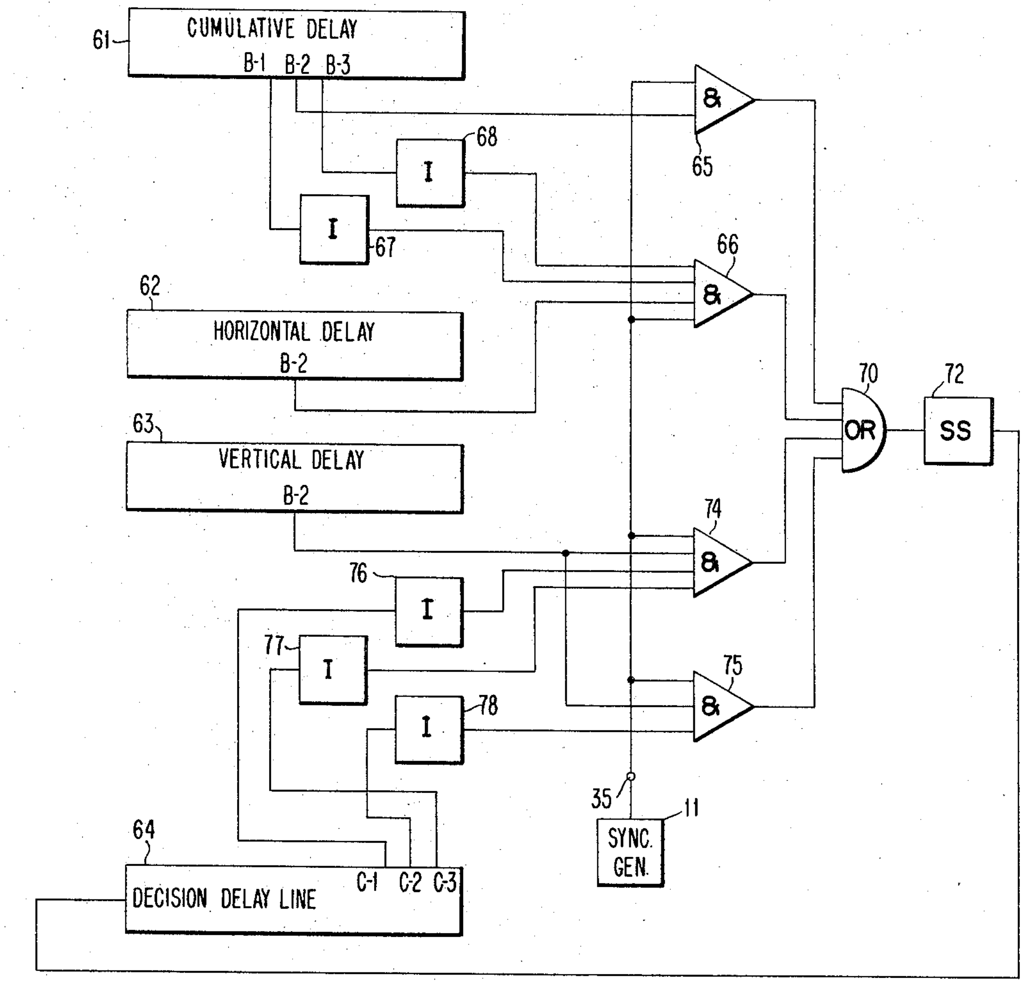
Figure 4:
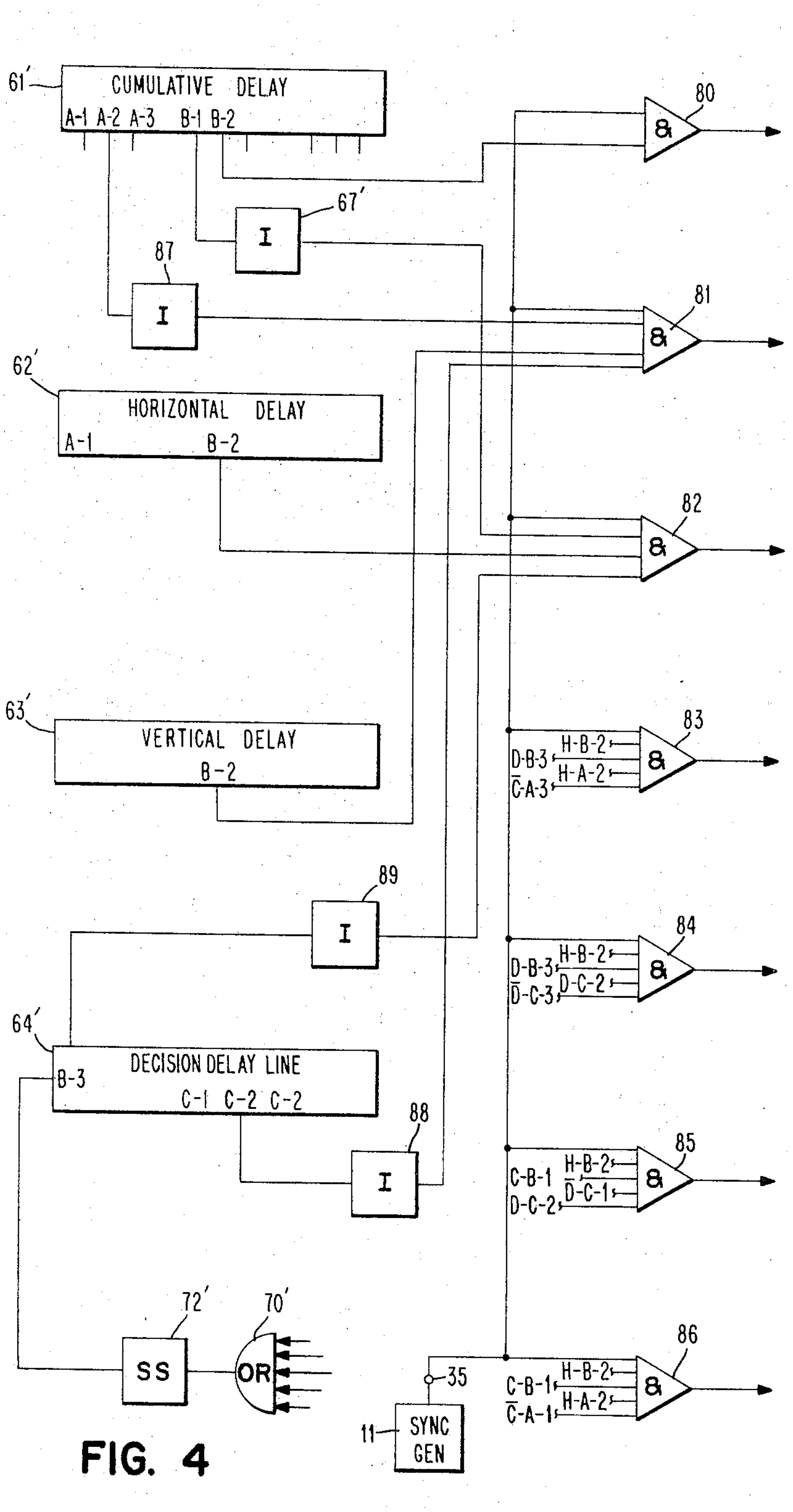
Figure 5:
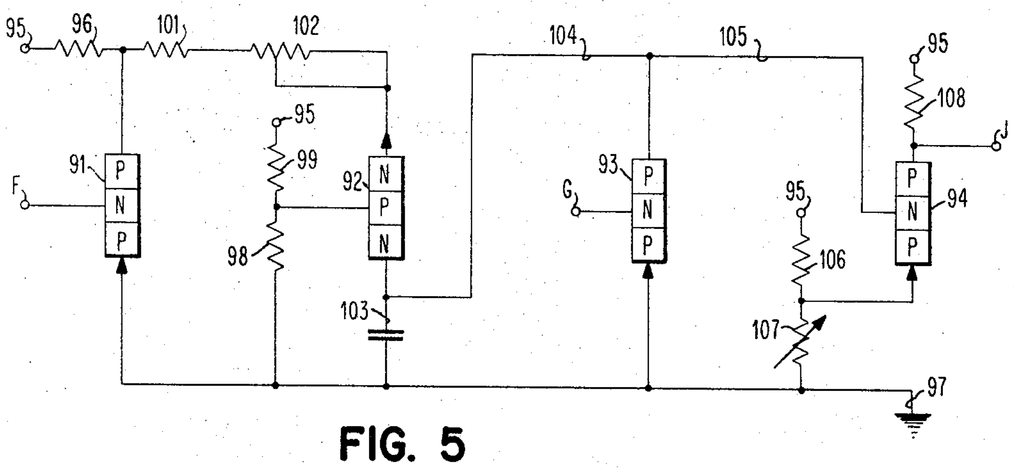
Figure 6:
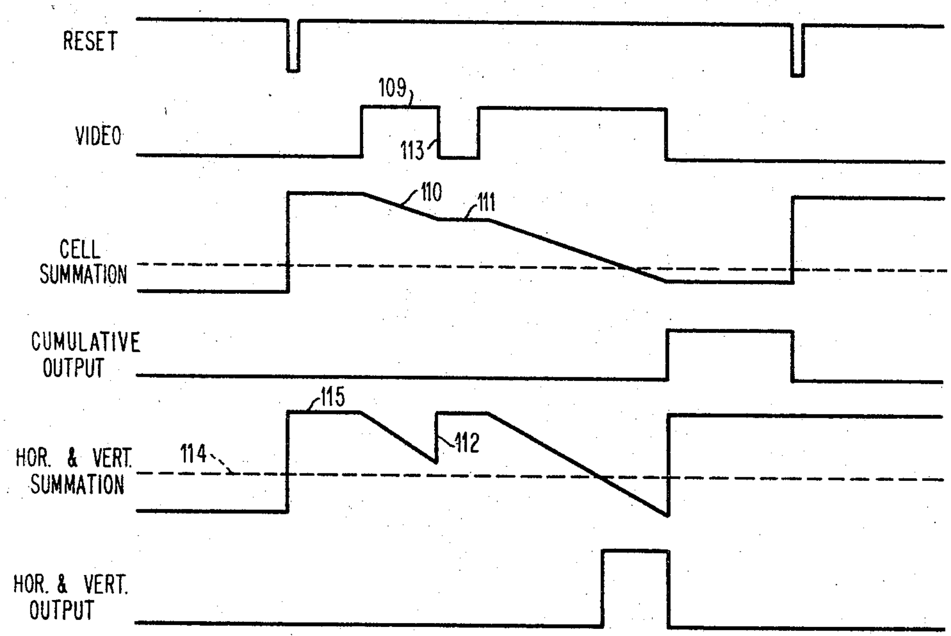

In the drawings:

FIG. 1 is a block diagram of a portion of the instant invention including the scanning, synchronizing, and summing circuits employed therein, FIG. 2 shows a representative pattern of scanning a cell which may be employed in the instant invention to reach a decision as to the nature of a signal existing within the center cell, FIG. 3 is a block diagram of a first embodiment of a data handling system employed to operate with the system shown in FIG. 1, FIG. 4 is a block diagram of a second embodiment of a data handling system employed to operate with the system shown in FIG. 1, FIG. 5 is a schematic view of a typical summing circuit employed in the instant invention, and FIG. 6 shows various input-output waveforms associated with the summing circuit shown in FIG. 5.

Similar reference characters refer to similar parts in each of the several views.

Referring now to FIG. 1, there is shown a block diagram of a portion of the instant invention including a flying spot scanner for scanning characters on a record medium for analysis and recognition. A document 4 having thereon characters to be analyzed, such as a character "2" shown in the drawing is moved, by document transport means not shown, past an analyzing or scanning station, in the direction shown by the arrow. At the scanning station, suitable means is provided for scanning the document and the characters thereon. For the purposes of this disclo sure a flying spot scanner is shown comprising a cathode ray tube 5, with suitable horizontal and vertical deflection circuits 7 and 9 respectively, which are governed by a suitable synchronizing circuit 11. The horizontal and vertical deflection circuits are arranged and synchronized so that the spot of the scanner sweeps out a succession of tall narrow rasters. Each raster comprises a large plurality of short horizontal scans and each scan is displaced vertically from the preceding scan. One such raster is seen in the drawing, as projected from the cathode ray tube through a lens system indicated symbolically at 13, onto the surface of the document 4. The characters are scanned by a plurality of adjacent tall narrow rasters preferably overlapped by a small predetermined interval.

The reflected variations in light resulting from the scanning operation are transduced by a photomultiplier 15 or other suitable device which is effective for changing the variations of the reflected light to electrical signals to provide trains of scanning or video signals which vary in accordance with the scanning of a character or the document background. The video or scanning signals from the photomultiplier 15 are supplied to a video amplifier 17, which is of conventional design and serves to amplify the signals to adequate levels for further use. The video signals are clipped by a suitable clipper 19, which is governed by a clipping level control circuit 20. The output of the clipper 19 is applied to a plurality of examination circuits 21, 22 and 23 respectively by means of a line 24, which circuits generate a coherent output signal for each examination.

FIG. 1 also shows the necessary apparatus for supplying timing or synchronizing pulses for the remainder of the system. The sync generator 11 applies a series of pulses to a scan counter 26 and a cell counter 28 by means of a line 30. These pulses indicate the beginning of a horizontal scan and synchronize the information flowing from the clipper 19 with a corresponding scanning operation of the character. The cell counter 28, which may take any one of the number of well-known forms, counts a sufficient number of signals from the sync generator 11 to determine the end of a vertical raster. An output from the cell counter 28 is available on a line 42 upon the completion of the last horizontal scan in the vertical raster. The pulses applied to the scan counter 26, which counter may take any one of a number of well-known forms, advance the counter one position at a time and generate an output pulse corresponding to each of its positions. For the purposes of this description the cell counter comprises three positions corresponding to the three horizontal scanning operations associated with each cell. Each of the output pulses from the scan counter 28 is available for the duration of an entire scan period. Additionally, the scan counter 26 has a final output available on a line 34 which indicates the completion of the third or last horizontal scan during one cycle of the scan counter 26. Finally, the synchronizing circuit has an output drive pulse available from its terminal 35 for application to the data handling circuits employed by the instant invention, which circuits are shown in greater detail in FIGS. 3 and 4. These drive pulses are generated to correspond with each of the horizontal scan periods.

In this embodiment of the instant invention, the scanning of a black area by the flying spot scanner 5 and the reception of the reflected optical signals by the photomultiplier 15 is represented by a series of positive signals from the clipper 19. The scanning of a white area produces negative signals from the clipper 19.

The output of the clipper 19 is applied to a cell integrating circuit 36. The cell integrater has a reset pulse applied thereto by means of a line 34 from the scan counter 26. This reset signal occurs at the completion of a scanning operation for one cell area. Therefore, the cell integrator operates to sum the video signals obtained from the scanning of an entire cell area. A coherent output signal from the integrating circuit 36 is applied to a multivibrator 38 which forms a digital signal level indicative of either a black or white cell condition. Setting the multivibrator to obtain a positive output indicates a black area. The output of the multivibrator 38 is applied to a cell delay line 61 shown in FIG. 3. The output of the clipper 19 is also applied to a horizontal integrator '40 which sums the black signals applied thereto. Additionally, the integrator 40 has a reset signal applied thereto from an OR gate 42. The signals applied to the OR gate 42 consist of an end of scan signal from the scan counter 26, and the video signal from the clipper circuit 19. The coherent output from the horizontal integrator 40 is applied to a multivibrator 43 driving it to its stable state wherein it applies its output signal to a horizontal delay line 62 shown in FIG. 3.

Finally, the output from the clipper 19 is applied to a vertical integrator 44, which integrator additionally has a reset signal applied thereto from an OR gate 46. The inputs to the OR gate 46 consist of the end of a cell signal from the scan counter 26, the end of a vertical raster signal from the cell counter 28, and the video signal from the clipper 19. The output signal from the vertical integrator 44 is applied to a plurality of AND gates 48 through 50 respectively. The AND gate 50 has an additional enabling signal from the scan counter 26, which signal corresponds to the duration of the first scan period within a particular cell. The enabling signal allows the output signal from the vertical integrator to pass through the AND gate 50 if such a signal occurs during the first horizontal scan of a particular cell. The output of the AND gate 50 sets a multivibrator 51 to a stable state wherein it applies a positive output to an AND gate 53. The AND gate 49 has an enabling signal applied thereto from the second position of the scan counter 26, which signal corresponds to the duration of the second horizontal scan period within a particular cell area. This enabling signal allows the AND gate to pass therethrough the output signal from the vertical integrator occurring during the duration of the second horizontal scan. The AND gate 49 applies its output to a multivibrator 55 setting it to a stable state wherein it applies a positive output to the AND gate 53. The AND gate 48 has enabling signal applied thereto from the third position of the scan counter 26, which signal corresponds to the duration of the third horizontal scanning period. This enabling signal from the third position of the scan counter 26 allows the output signal from the vertical integrator appearing during this scan period to pass therethrough and set a multivibrator 57 to a stable state wherein it applies a positive output signal to the AND gate 53. Upon the simultaneous application of three enabling signals from the multivibrators 51, 55 and 57 to the AND gate 53, the AND gate is enabled and applies a vertical coherent output signal to a delay line 63 shown in FIG. 3.

In operation, the circuitry shown in FIG. 1 operates to moves the flying spot scanner across the character area of the document to be scanned and to detect the reflected video signals representative of the nature of the area undergoing the instantaneous scanning operation by the photomultiplier tube 15. The nature of the area is either black or white representing the character or the background respectively. The output of the photomultiplier tube is amplified and clipped giving a train of positive pulses, which pulses represent a black signal. Additionally, a negative level pulse is indicative of a white condition. The two level signal or the video signal output from the clipper 19 is applied to the plurality of examination circuits 21, 22 and 23.

The examination circuit 21 sums the total video signal occurring during a particular cell of information. It is constructed so as to give a cumulative output signal whenever a black signal occurs during a certain percentage of the duration of a cell examination. The examination circuit 22 examines the entire video signal occurring during a single cell area for a contiguous black signal which persists for a minimum length of time. The detection of such a minimum continuous signal sets a multivibrator to provide an output pulse therefor. The examination circuit 23 consists of a plurality of circuits, which circuits examine each individual scan within a particular cell area for a repetitive black signal of a minimum duration. In order for the examination circuit 23 to give an output, it is necessary that such a minimum signal occur during each horizontal scan within a cell.

Referring to FIG. 2 there can be seen the scanning pattern employed by the instant invention for recognizing written characters. Horizontal groups of cells are called rows and are identified by the numerals 1, 2, 3. Vertical groups of cells are called columns and are identified as A, B, C. The first cell to be scanned by the flying spot scanner employed by the instant invention is found in row 3, column C and is located between the pairs of parallel lines 58 and 59 respectively. Successive cells in column C are scanned in turn until the last cell therein. At this time the scanning begins in the column B, row 3. This first cell in column B shows the three horizontal scans contained within one cell and illustrates the horizontal examination employed in the instant invention. That is, a black signal is indicated by the partially filled-in section of the first two adjacent scans. Additionally, it should be noted that these portions of the scan are contiguous, since the scanning is from left to right. For the purpose of this embodiment of the instant invention, the minimum duration of a contiguous horizontal signal has been chosen as one third of a cell. Obviously, this minimum requirement is satisfied by a complete horizontal scan or by contiguous portions of adjacent scans. The second cell in column B, row 2, also contains three individual scanning areas. This cell illustrates the vertical examination wherein the black signal is represented by the filled-in portion. It should be noted that the black signal may occur anywhere within one particular scan but must last for a minimum length of time, which time for the purposes of this embodiment has been chosen as one third of a single horizontal scan period. Additionally, it should be noted that the black signal must be repeated during each scan period in order for the entire cell to have one output signal representative of a vertical signal for the entire cell. The third cell in column B, row 3, is an illustration of the cell summation function performed by the instant invention wherein the black signal for each of three scanning periods is summed for the entire cell. For the purposes of this embodiment of the instant invention, a black signal must exist for 80 percent of the cell area to produce a vertical output signal. Furthermore, the cells shown in columns A, B and C and rows 1, 2 and 3 comprise a single zone.

Referring to FIG. 3 there may be seen a plurality of delay lines 61 through 64 employed in the data handling portion of the instant invention. The cell delay line 61 receives positive pulses from the multivibrator 38 associated with the examination circuit 21 and stores the output signals from this circuit. The horizontal delay line 62 is connected to the multivibrator 43 associated with the examination circuit 22 which determines the existence of a horizontal summation signal. The vertical delay line 63 is connected with the AND gate 53 associated with the vertical examination circuit 23, which determines the existence of a vertical summation signal within a cell area. The delay lines 61 through 64 are standard in construction and for example may consist of a plurality of multivibrators connected to transfer data from its first stage to its last stage in synchronism with a shift pulse, not shown. Each successive delay line stage contains the coherent signal from its associated summing circuit. For simplicity in understanding the combination of the various signals contained in all the delay lines, each position in each delay is identified by the same column-row nomenclature employed to identify the cell from which the coherent signal originates. Obviously, this description is given for one set of circumstances and while the nomenclature changes for each new scanning area the spacial relationship among the various signals does not change. Accordingly, position B–2 of the delay line 61 is connected to an AND gate 65, and positions B–1 and B–3 of delay line 61 are connected to an AND gate 66 by means of inverters 67 and 68 respectively and position B–2 of the delay line 62 is connected directly to the AND gate 66. AND gates 65 and 66 have an additional enabling input drive pulse from terminal 35 of the sync generator 11. This drive pulse is employed to gate the information from the positions of the delay line to an OR gate 70. The OR gate 70 operates a single shot multivibrator 72 for forming a suitable pulse to store in the delay line 64. Additionally, a consolidated output from the single shot multivibrator 72 indicates that a decision has been made wherein the nature of the cell being scanned has been determined to be black. These signals from the single shot multivibrator 72 are applied to the delay line 64 and move down the delay line in synchronism with the shift pulse. Position B–2 of delay line 63 is connected directly to an AND gate 74 and an AND gate 75. Positions C–1 and C–3 of delay line 64 are connected to the AND gate 74 by means of inverters 76 and 77 respectively. Also, position C–2 of the delay line 64 is connected to the AND gate 75 by an inverter 78. AND gates 74 and 75 receive the same enabling input pulse from the sync generator 11. The consolidated output signals from the gates 74 and 75 are additionally applied to the OR gate 70.

In operation the contents of position B–2 of the delay line 61 may furnish sufficient criteria to determine that the nature of a particular cell being examined should be black or white. This determination is said to be black when a cumulative signal exists within the cell delay line at the position corresponding to the cell under examination. For purposes of our discussion, this cell has been selected as B–2 and the position B–2 of the delay line 61 is shown connected to the AND gate 65. Additionally, the AND gate 65 has a drive pulse applied thereto. Whenever these two signals simultaneously exist within the AND gate 65, a signal is applied to the OR gate 70 which drives the single shot multivbrator 72 and enters a decision pulse into the decision delay line 64. If no cumulative pulse exists in position B–2 in delay line 61, it is possible to get a decision that the nature of a cell under examination is black by combining the information contained in the delay lines 61 and 62. The decision is based upon the presence of a horizontal pulse in position B–2 of delay line 62 and the absence of a cumulative signal in both positions B–1 and B–3 in delay line 61. Upon the satisfaction of this requirement, the AND gate 66 is enabled by the drive pulse applied thereto and applied its output signal to the OR gate 70 which again enters a positive pulse into the delay line 64 by means of the single shot multivibrator 72.

Additionally, in the absence of a decision corresponding to the data in the delay lines 61 and 62, it is possible to obtain a signal calling the nature of the cell under examination black by means of the data within the delay line 63 and the delay line 64. In this case the logic circuitry is represented by the AND gates 74 and 75 and their respective connections with the delay lines 63 and 64. The delay line 63 stores the results of the vertical examinations of each cell. Upon the satisfaction of the vertical examination criteria, a pulse is generated and applied to the delay line 63. Therefore, the presence of this pulse in position B–2 and the absence of a previous black decision in cells C–1 and C–3, as stored in delay line 64, determines the presenceof a black signal in cell B–2. Additionally, the presence of a vertical pulse in position B–2 and the absence of a black decision pulse in position C–2 determines the presence of a black signal in cell B–2. Positions C–1 and C–3 of delay line 64 are connected to AND gate 74 by means of inverters 76 and 77. Position C–2 is connected to AND gate 75 by means of an inverter 78.

Referring to FIG. 4, there is shown the same delay lines as contained in FIG. 3, but with the added requirement that each delay line be longer in length. The same philosophy is followed in combining various output signals from the different delay lines in AND gates in order to obtain a plurality of possibilities that the nature of the cell under examination should be called black. The inputs for the AND gates 80, 81 and 82 are shown connected to their various locations within the delay lines 61′ through 64′. However, the connections for the AND gates 83 through 86 respectively have been omitted for purposes of clarity. However, their connections to the delay lines 61′ through 64′ are indicated on each input line to its respective AND gate.

The operation of the circuit shown in FIG. 4 is similar to that of the circuit shown in FIG. 3. The AND gate 80 has two input signals one of which is a cumulative signal from positions B–2 of the delay line 61′, and the other is the enabling pulse from the synchronizing circuit 11. The AND gate 81 has four input signals, the first of which is a vertical signal from position B–2 of the delay line 63′, the second of which is applied from an inverter 87 and indicates the absence of a cumulative signal located in position A–2 of the delay line 61′, the third of which is applied from an inverter 88 and indicates the absence of a black decision from the C–2 cell position of the delay line 64′ and the fourth of which is the enabling drive pulse from the synchronizing circuit 11. An inverter is employed to indicate the absence of a signal in a delay line position. The AND gate 82 has four input signals, the first of which is a horizontal signal from position B–2 of the delay time 62′, the second of which indicates the absence of a cumulative signal from position B–1 of the delay line 61′, the third of which is applied from an inverter 89 and indicates the absence of a black decision in the B–3 cell position of the delay line 64′ and the fourth of which is an enabling pulse from the synchronizing generator 11.

The AND gate 83 has four input signals in addition to its enabling pulse, the first of which is a horizontal signal from position B–2 of the delay line 62′, the second of which is a black decision signal from position B–3 of the delay line 64′, the third of which is a horizontal signal from position A–2 of the delay line 62′, and the fourth of which is the absence of a cumulative signal from position C–3 of the delay line 61′. The AND gate 84 has four input signals in addition to its enabling pulse, the first of which is a horizontal signal from position B–2 of the delay line 62′, the second of which is a black decision signal from position B–3 of the delay line 64′ and the third of which is a black decision signal from position C–2 of the delay line 64′ and the fourth is the absence of a black decision signal from the position C–3 of the delay line 64′. The AND gate 85 has four input signals in addition to its enabling signal, the first of which is a horizontal signal from position B–2 of the delay line 62′, the second of which is a cumulative signal from position B–1 of the delay line 61′, the third of which is the absence of a black decision signal from position C–1 of the delay line 64′, and the fourth of which is a black decision signal from position C–2 of the delay line 64′. The AND gate 86 has four input signals in addition to its enabling signal, the first of which is a horizontal signal from position B–2 of the delay line 62′, the second of which is a cumulative signal from position B–1 of the delay line 61′, the third of which is a horizontal signal from position A–2 of the delay line 62′, and the fourth of which is the absence of a cumulative signal from position A–1 of the delay line 61′.

The above recited connections are examples of logic operations whereby the consolidation signals from past and future cell examinations can be employed to obtain more reliable and accurate black-white nature of each cell. Other combinations can be compiled and the recited combinations are not to be taken as an exhaustive listing. However, the described combinations demonstrate the manner in which the horizontal, vertical and cumulative summation signals are combined to give a more accurate data consolidation circuit.

Referring to FIG. 5, there can be seen a schematic diagram of the summation circuit employed by the instant invention including a plurality of transistors 91, 92, 93 and 94. The video signal from the clipper 19 is applied to terminal F connected to the base of the transistor 91. The collector lead of the transistor 91 is connected to a negative source of potential 95 by means of a load resistor 96. The emitter of transistor 91 is connected to ground 97. The base of the transistor 92 is connected to the junction of a pair of biasing resistors 98 and 99 which resistors are connected between ground potential 97 and the source of negative potential 95. The emitter of the transistor 92 is connected to the junction of the collector lead of transistor 91 and the resistor 96 by means of a series connection of a fixed resistor 101 and a variable resistor 102. The collector of the transistor 92 is connected to ground 97 by means of a capacitor 103. The junction of the capacitor 103 and the collector lead of the transistor 92 is connected to the collector of the transistor 93 by means of a line 104, and to the base lead of the transistor 94 by means of a line 105. Additionally, the emitter of the transistor 93 is connected to ground 97. The base of the transistor 93 is connected to a terminal G which is a source of reset pulses. The emitter of the transistor 94 is connected to a junction of a fixed biasing resistor 106 and a variable biasing resistor 107, which resistors are connected between ground potential 97 and the source of negative potential 95. The collector lead of the transistor 94 is connected to a source of negative potential 95 by means of a load resistor 108 and is connected to an output terminal J. A suitable voltage level for the source 95 is a −6 volts.

Referring to FIG. 6, there can be seen a plurality of waveforms which are associated with the summing circuit shown in FIG. 5. The first waveform illustrates the reset pulses which are applied to the terminal G of the summing circuit. The second waveform is a representative video signal generated by the clipping circuit shown in FIG. 1. This waveform is applied to terminal F of the summing circuit in FIG. 5. The third wave-shape is the voltage charge which appears across the capacitor 103 of the summing circuit when the summing circuit is connected as the cumulative circuit 21.

Referring again to the second waveform in FIG. 6, the positive levels, as at 109, represent a black signal from the clipper 19 and the more negative levels of the video signal represent a white signal. The summation of the video signal in the circuit 36 is illustrated by the third waveform shown in FIG. 6. During the application of a black video signal from the clipper 19 the capacitor begins to discharge as at 110. Then the application of a white signal from the clipper 19 holds the voltage level on the capacitor 103 constant, as at 111. Thereafter the reappearance of a positive signal continues to decrease the voltage level on the capacitor. The dotted line drawn through the third waveform is representative of the 80 percent line selected for the operation of the cell summation circuit 36. Whenever the charge on the capacitor 103 is below this level, an output pulse is generated as shown on line 4 of FIG. 6. The waveform shown on the fifth line of FIG. 6 represents the charge on the capacitor 103 for both the horizontal summation circuit 40 and the vertical summation circuit 44 acting in response to a video signal such as that appearing on line 2 of FIG. 6. It must be kept in mind that the circuit 40 and the circuit 44 are reset by the video signal from the clipper 19 by means of the OR gates 42 and 46, as shown in FIG. 1, whenever there is a white signal from the clipper 19. This reset function is shown on the waveform appearing on line 5, as at 112, of FIG. 6 corresponding to the occurrence of a white signal, as at 113, appearing on line 2. This white signal returns the charge on the capacitor 103 to its initial level. Thereafter, the charge must increase to its maximum value during the remaining portion of the video signal within a particular cell or within a particular horizontal scan as with the vertical summation circuit 44. Once the capacitor 103 has been reset by a white signal within the horizontal or vertical summation circuits 40 and 44 respectively, it again seeks to charge towards the level set whereupon it may indicate the presence of either a horizontal or vertical signal. This level is represented in line 5 of FIG. 6 by a dotted line 114 drawn therethrough. It can be seen that the output pulse from the summation circuits 40 and 44 respectively, represented by a waveform located on line 6 of FIG. 6 is available for the time during which the charge on the capacitor is below the preset level 114, as shown in waveform 5 of FIG. 6. It should be kept in mind that for the horizontal summation circuit 40 to indicate the presence of a horizontal signal, the summation circuit examines the video signal and determines that a back signal existed for a minimum length of time within a cell area. However, for the vertical summation circuit to indicate the presence of a vertical signal, the video signal should contain a vertical component having a certain minimum length of black signal on each scanning segment within a particular cell.

The operation of the summation circuit shown in FIG. 5 will be explained for the specific operation of a horizontal summation circuit 40 as shown in FIG. 1. It is reset by both the normal reset pulse corresponding to an end of a cell period, as shown by the waveform on line 1 of FIG. 6, and is reset by the occurrence of a white signal as shown at 113 on line 2 in FIG. 6. Therefore, the charge appearing across the capacitor 103 is actually represented by the waveform appearing on line 5 of FIG. 6. A reset pulse is applied to the transistor 93 to return the capacitor to its maximum charge level as represented at 115 on line 5 of FIG. 6. Thereafter, the video signal applied to terminal F turns off the transistor 91 allowing the voltage at the junction of the resistors 96 and 101 to drop towards a negative level of the potential source 96, thereby turning on the transistor 92 and permitting the charge on the capacitor 103 to drain through transistor 92 towards the negative level of potential source 95. However, upon the application of a white signal as at 113 on line 2 of FIG. 6, to the base level of the transistor 93 the capacitor is returned to its most positive condition by causing transistor 93 to conduct and fully charge the capacitor 103. Thereafter, the continuation of a black video signal of the base of the transistor 91 again turns this transistor off permitting the capacitor 103 to discharge through the transistor 92. The reference potential illustrated by the dotted line drawn through waveform 5 is generated by the resistors 106 and 107 and is applied to the emitter lead of the transistor 90. Therefore, whenever the charge on the capacitor 103 is reduced below the reference voltage, transistor 94 conducts and generates an output signal as illustrated by the waveform on line 6 of FIG. 6.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a pattern recognition system of the type employing scanning means for producing successive short video scans along one co-ordinate of a character position and progressively displaced scans along the remaining co-ordinate, and detection means for separating the reflected video signals into black and white signal levels, a data consolidation system therefor comprising, first means for grouping the scans into successive cell scanning areas, second means connected to said detection circuit for generating a cumulative output signal from said reflected video signals associated with each of a plurality of said successive cell scanning areas, third means connected to said detection circuit for generating a contiguous output signal from said reflected video signals associated with each of a plurality of said successive cell scanning areas, fourth means having a plurality of storage positions for storing said cumulative output signal associated with said successive cell scanning areas, fifth means having a plurality of storage positions for storing said contiguous output signal associated with said successive cell scanning areas, sixth means responsive to certain of said positions of said fourth and fifth storing means for indicating a consolidated output signal for an intermediate cell scanning area.

2. A data consolidation system as recited in claim 1 and further including, seventh means for detecting a contiguous black signal as a portion of each scan within one of said scanning areas, eighth means having a plurality of storage positions and responsive to the output of said seventh means, ninth means having a plurality of storage positions and responsive to the output signal of said sixth means for storing said consolidated output signals, and tenth means responsive to certain of said positions of said eighth and ninth storing means for indicating a further consolidated output signal.

3. In a pattern recognition system of the type employing scanning means for producing successive short video scans along one co-ordinate of a character position and progressively displaced scans along the remaining co-ordinate, and detection means for separating the reflected video signals into black and white signal levels, a data consolidation system therefor comprising, first means for grouping the scans into successive cell scanning areas, first summing means connected to said detection circuit for generating a cumulative output signal from said reflected video signals associated with each of a plurality of said successive cell scanning areas, second summing means connected to said detection circuit for generating a contiguous output signal from said reflected video signals associated with each of a plurality of said successive cell scanning areas, a first digital delay line having a plurality of storage positions for storing a plurality of said cumulative output signals, a second digital delay line having a plurality of storage positions for storing a plurality of said contiguous output signals, and second means responsive to certain of said positions of said first and said second delay lines for generating a consolidated signal for an intermediate cell scanning area.

4. A data consolidation system as recited in claim 3 and further including, third means for detecting a contiguous black signal as a portion of each scan within one of said scanning areas, fourth means having a plurality of storage positions and responsive to the output signal of said third means, fifth means having a plurality of storage positions and responsive to the output signal of said second means for storing said consolidated output signals, and sixth means responsive to certain of said positions of said fourth and fifth storing means for indicating a further consolidated output signal.

5. In a pattern recognition system of the type employing scanning means for producing successive short video scans along one co-ordinate of a character position and progressively displaced scans along the remaining co-ordinate, a detection circuit for separating the reflected video signals into black and white signal levels, and means for grouping said scans into successive cell scanning areas, a data consolidation system therefor comprising, first summing means connected to said detection circuit for generating a cumulative output signal from said reflected video signals associated with each of a plurality of successive scanning areas, second summing means connected to said detection circuit for generating a contiguous output signal corresponding to each of said cumulative signals, a first shift register connected to said first summing means for storing a plurality of said cumulative output signals, said first shift register being equipped with a plurality of output connections for giving access to its stored signals, a second shift register connected to said second summing means for storing a plurality of said contiguous output signals, said second shift register being equipped with a plurality of output connections for giving access to its stored signals, logic means connected to a plurality of adjacent output connections of said first shift register and to a second shift register position for combining said stored signals, and said second shift register connection corresponding to an intermediate connection of said first shift register whereby, said logic means generates a consolidated signal for successive scanning areas.

6. In a pattern recognition system of the type employing scanning means for producing successive short video scans along one co-ordinate of a character position and progressively displaced scans along the remaining co-ordinate, detection means for separating the reflected video signals into black and white signal levels, and means for grouping said scans into successive cell scanning areas, a data consolidation system therefor, comprising, first summing means connected to said detection circuit for generating a cumulative output signal from said reflected video signals associated with each of a plurality of successive scanning areas, second summing means connected to said detection circuit for generating a contiguous output signal corresponding to each of said cumulative signals, third summing means connected to said detection circuit for generating a vertical output signal corresponding to each of said cumulative signals, a first delay line connected to said first summing means for storing a plurality of said cumulative output signals, said first storing means being equipped with a plurality of output connections for giving access to said stored cumulative output signals, a second delay line connected to said second summing means for storing a plurality of said contiguous output signals, said second storing means being equipped with a plurality of output connections for giving access to said stored contiguous output signals, a third delay line connected to said third summing means for storing a plurality of said vertical output signals, said third storing means being equipped with a plurality of output connections for giving access to said stored vertical output signals, first logic means connected to said output connections of said first storing means for generating a consolidated output signal, second logic means connected to said output connections of said first storing means and to said output connection of said second storing means for generating a consolidated output pulse for an intermediate scanning area, a fourth delay line connected to said first and second logic means for storing said consolidated output pulses, and third logic means responsive to all of said storing means for generating consolidated output pulses for an intermediate scanning area.

7. In a pattern recognition system of the type wherein successive short video scans are made along one co-ordinate of a character position and progressively displaced scans are made along the remaining co-ordinate, and wherein reflected video signals are separated into black and white signal levels, a data consolidation system therefor, comprising, means for grouping the scans into successive cell scanning areas, summing the reflected video signals corresponding to a primary cell scanning area, means for sensing a contiguous portion of a black reflected signal within said primary cell scanning area, means responsive to said summing means and said sensing means for storing the results of said summing means and sensing means in said primary area and in a plurality of previous cell areas, means for recycling said summing means and sensing means with respect to a plurality of cell areas succeeding said primary cell area, means for storing the results of said summing means and said sensing means for each cell area, means for retrieving the stored results, and means for consolidating said retrieved results to obtain a decisional output signal for said primary cell scanning area.

8. In a pattern recognition system of the type wherein successive short video scans are made along one co-ordinate of a character position and progressively displaced scans are made along the remaining co-ordinate, and wherein reflected video signals are separated into black and white signal levels, a data consolidation system therefor, comprising, means for grouping the scans into successive cell scanning areas, summing the reflected video signals corresponding to a primary cell scanning area, means for sensing a contiguous portion of a black reflected signal within said primary cell scanning area, means for detecting a repetitive contiguous black signal on each scan within a cell area, means for storing the results of said summing means and said sensing means and said detecting means during an examination of said primary cell area and a plurality of previous cell areas and a cell area succeeding said primary cell, means for retrieving the results of said summing means and sensing means and detecting means pertaining to said primary cell area, and means for consolidating the results of all of said stored signals to obtain a decisional output signal for said primary cell scanning area.

9. In a pattern recognition system of the type wherein successive short video scans are made along one co-ordinate of a character position and progressively displaced scans are made along the remaining co-ordinate, and wherein reflected video signals are separated into black and white signal levels, a data consolidation circuit therefor, comprising, means for grouping the scans into successive cell scanning areas, first means for examining the reflected video signals corresponding to a primary scanning area, first means for storing the results of said examination for said primary area and for a plurality of previous cell areas, second means for examining including said first examining means a plurality of cell areas succeeding said primary cell, said storing means being employed for storing the results of said second examination, means for retrieving the results of certain of said first and said second examinations for said primary cell and for said cell areas surrounding said primary cell, means for combining said retrieved results for generating a consolidated signal, means for storing said consolidated signals, means for retrieving said consolidated signals, and means for combining said retrieved consolidated signals with said results of said first and second examination to obtain a decisional output signal for said primary cell scanning area.

10. The consolidation system as recited in claim 9 wherein said examining means comprises, means for summing the cumulative black signal in a cell area, means for sensing a contiguous black signal within a cell area, and means for detecting a repetitive contiguous black signal on each scan within a cell area.

11. The consolidation system as recited in claim 10, wherein said examining means comprises, means for summing the cumulative black signal in a cell area, means for sensing a contiguous black signal within a cell area, and means for detecting a repetitive contiguous black signal on each scan within a cell area.

12. In a pattern recognition system of the type employing scanning means for producing successive short video scans along one co-ordinate of a character position and progressively displaced scans along the remaining co-ordinate, and detection means for separating the reflected video signals into black and white signal levels, a data consolidation system therefor comprising, first means for grouping said scans into successive cell scanning areas, second means for determining the black-white nature of a plurality of cells in one vertical direction, third means for detecting a contiguous black signal as a portion of each scan within an additional cell adjacent to an intermediate cell in said group of cells, fourth means having a plurality of storage positions and responsive to the output signal of said third means, fifth means having a plurality of storage positions and responsive to the output signal of said second means for storing the signals indicative of the black-white nature of said cells, and sixth means responsive to certain of said positions of said fourth and fifth storing means for indicating a consolidated output signal.

13. In a pattern recognition system of the type employing scanning means for producing successive short video scans along one co-ordinate of a character position and progressively displaced scans along the remaining co-ordinate, detection means for separating the reflected video signals into black and white signal levels, a consolidation system therefor, comprising, means for grouping the scans into successive cell scanning areas, means for examining the reflected video signals corresponding to a plurality of scanning areas, means for storing the results of said examination of a primary area and for a plurality of previous cell areas, said examining means further examining a plurality of cell areas succeeding said primary cell area, means for storing the results of said examination of said succeeding cell areas, means for retrieving said stored results from said examinations of cells adjacent said primary cell, means for consolidating said retrieved results to obtain a decisional output signal for said primary cell scanning area.

14. The consolidation system as recited in claim 13, wherein said examining means comprises, means for summing the cumulative black signal in a cell area, means for sensing a contiguous black signal within a cell area, and means for detecting a repetitive contiguous black signal on each scan within a cell area.

15. In a pattern recognition system of the type employing scanning means for producing successive short video scans along one co-ordinate of a character position and progressively displaced scans are made along the remaining co-ordinate, detection means for separating the reflected video signals into black and white signal levels, a consolidation system therefor, comprising, means for grouping said scans into successive cell scanning areas, means for examining the reflected video signals corresponding to a primary cell scanning area and a plurality of adjacent cell areas, means for storing the results of said examinations, and means responsive to said stored results for consolidating said results to obtain a decisional output signal for said primary cell scanning area.

16. The consolidation system as recited in claim 15, wherein said examination means comprises, means for summing the cumulative black signal in a cell area, means for sensing a contiguous black signal within a cell area, and means for detecting a repetitive contiguous black signal on each scan within a cell area.

References Cited

UNITED STATES PATENTS

| | | | |
|---|---|---|---|
| 3,196,392 | 7/1965 | Horwitz | 340—146.3 |
| 3,202,965 | 8/1965 | Nadler | 340—146.3 |

FOREIGN PATENTS

| | | |
|---|---|---|
| 1,342,180 | 9/1963 | France. |

OTHER REFERENCES

Kamentsky, L. A.: Proceedings of the Western Joint Computer Conference, 1959, pp. 304–09.

Grimsdale, R. L.: Proc. of I.E.E., Paper No. 2792M, December 1958, pp. 210–21.

Bomba, J. S.: Proc. of Eastern Joint Computer Conf., 1959, pp. 218–24.

Unger, S. H.: Proc. of IRE, October 1959, pp. 1737–51.

MAYNARD R. WILBUR, *Primary Examiner.*

DARYL W. COOK, *Examiner.*

J. E. SMITH, J. SCHNEIDER, *Assistant Examiners,*